US012358006B2

(12) United States Patent
Loiti Urquia

(10) Patent No.: US 12,358,006 B2
(45) Date of Patent: Jul. 15, 2025

(54) PRESSURIZED SPRAYER

(71) Applicant: GOIZPER, S.COOP., Antzuola (ES)

(72) Inventor: Mikel Loiti Urquia, Antzuola (ES)

(73) Assignee: Goizper, S.Coop., Antzuola (ES)

( * ) Notice: Subject to any disclaimer, the term of this patent is extended or adjusted under 35 U.S.C. 154(b) by 102 days.

(21) Appl. No.: 18/006,859

(22) PCT Filed: Apr. 21, 2022

(86) PCT No.: PCT/ES2022/070247
§ 371 (c)(1),
(2) Date: Jan. 25, 2023

(87) PCT Pub. No.: WO2022/229484
PCT Pub. Date: Nov. 3, 2022

(65) Prior Publication Data

US 2024/0278268 A1 Aug. 22, 2024

(30) Foreign Application Priority Data

Apr. 29, 2021 (ES) ............................ ES202130882U

(51) Int. Cl.
*B05B 9/043* (2006.01)
*B05B 9/08* (2006.01)

(52) U.S. Cl.
CPC ............ *B05B 9/0816* (2013.01); *B05B 9/043* (2013.01); *B05B 9/0811* (2013.01)

(58) Field of Classification Search
CPC .. B05B 9/04; B05B 9/043; B05B 9/08; B05B 9/0805; B05B 9/0811; B05B 9/0816; B05B 9/0822; B05B 9/0888
See application file for complete search history.

(56) References Cited

U.S. PATENT DOCUMENTS 4,135,669 A * 1/1979 Bridges .................... B05B 9/007 239/391
5,931,207 A * 8/1999 Gianino .................. F04B 35/06 417/411

(Continued)

FOREIGN PATENT DOCUMENTS

EP 3978141 A1 4/2022
JP 2002-059040 A 2/2002

OTHER PUBLICATIONS

International Search Report issued for International Patent Application No. PCT/ES2022/070247, dated Aug. 18, 2022 in 4 pages.

*Primary Examiner* — Darren W Gorman
(74) *Attorney, Agent, or Firm* — Knobbe, Martens, Olson & Bear, LLP

(57) ABSTRACT

A pressurised sprayer, including a tank, the tank including a main body, a head region and a plunger for manually pressurising the tank. The pressurised sprayer also includes a compressed air inlet for automatically pressurising the tank with air from outside, a pressure relief valve, a compressed flow outlet, and a removable, external compressor module that is independent of the tank, the compressor module for its part including an air compressor and a battery for supplying the air compressor with electricity, the compressor module being connected to the compressed air inlet, the compressor module being secured to the sprayer. The pressurised sprayer where the compressed air inlet includes a valve stem, the valve stem for its part being a non-return valve, and the compressor module being connected to the valve stem via a hose having a connection head.

17 Claims, 11 Drawing Sheets

(56) References Cited

U.S. PATENT DOCUMENTS

| | | | | |
|---|---|---|---|---|
| 6,109,548 | A * | 8/2000 | George | B05B 9/0811 222/333 |
| 7,971,803 | B1 * | 7/2011 | Barlowe | B05B 9/0816 239/525 |
| 8,985,482 | B1 | 3/2015 | Schrum et al. | |
| 10,532,370 | B2 | 1/2020 | Schrum et al. | |
| 2011/0057436 | A1 | 3/2011 | Schrum et al. | |
| 2014/0190998 | A1 * | 7/2014 | Liu | B05B 9/0413 222/402 |
| 2015/0283570 | A1 * | 10/2015 | West | F04B 17/06 239/373 |
| 2017/0252762 | A1 * | 9/2017 | Derman | B05B 9/0811 |
| 2018/0326437 | A1 * | 11/2018 | Franks | B05B 9/0861 |

* cited by examiner

PRESSURIZED SPRAYER

CROSS-REFERENCE TO RELATED APPLICATIONS

This application is the U.S. National Phase under 35. U.S.C. § 371 of International Application PCT/ES2022/070247, filed Apr. 21, 2022, which claims priority to Spanish Utility Model application No. 202130882, filed Apr. 29, 2021. The disclosures of the above-described applications are hereby incorporated by reference in their entirety.

FIELD OF THE INVENTION

The present invention relates to the field of pressurised sprayers that are intended to contain pressurised fluids for subsequently expelling said fluids in vaporised form. More specifically, the present invention relates to pressurised sprayers for domestic use in which the fluid inside the tank of the sprayer can be pressurised both manually and automatically.

BACKGROUND OF THE INVENTION

Pressurised sprayers can be classified into conventional sprayers, in which pressurised liquid is sprayed, and into foam sprayers, in which a mixture of pressurised liquid and gas is sprayed.

Conventional sprayers for domestic use are widely used for cleaning purposes, generally on outside surfaces, and in gardening for watering and fumigation tasks.

Equally, foam sprayers are widely used for cleaning surfaces with a high level of contaminants, by virtue of which said sprayers transform the cleaning agents contained in the liquid into an effective cleaning foam which can have an intensive effect and on the surface to be treated and produce deep cleaning results. In contrast to liquids, foam remains adhered to the surfaces to be treated, including on vertical surfaces, thus increasing the contact time between the active ingredient and the surface, and preventing excessive wetting of the regions to be cleaned. Additionally, given that the application of cleaning foam reduces the quantity of cleaning agent to be used, the cleaning foam is an economic alternative to cleaning by means of conventional spraying. Said foam sprayers are often used to clean cars and industrial machinery, as well as to clean and disinfect health facilities and large-scale catering establishments.

Pressurised sprayers that comprise a plunger for prior manual pressurisation are known from the prior art, i.e. sprayers in which the user must pressurise the tank manually before initiating the spraying process. In said sprayers, the tank loses pressure gradually during spraying, which in turn results in a variation in the outgoing flow rate during use of the sprayer. Once the user deems the pressure in the tank to be insufficient for continuing with spraying in an efficient manner, the user must stop the spraying process and proceed to manually repressurise the tank. This type of sprayer has the clear disadvantage that work must be stopped while still in progress in order for the tank to be pressurised, thus prolonging the duration of the spraying process and considerably reducing the efficiency of the process.

Furthermore, pressurised sprayers that comprise a compressed air inlet for pressurising the tank by means of an external system, for example a compressed air line or compressor, are also known in the prior art. This type of pressurised sprayer allows for continuous use thereof, provided that the flow rate of compressed air supplied is sufficient for counteracting the loss of pressure that originates inside the tank, since, when the liquid level drops, the volume occupied by the pressurised air increases, thus causing a drop in the pressure thereof. Nevertheless, said sprayers require additional elements, be it a compressed air line or an external compressor for compressed air, which are not generally accessible in many of the spaces in which the sprayers are used, for example public spaces such as gardens or public roads. This means that the user has to move the sprayer from the point of pressurisation to the point of use each time the pressure in the tank falls below acceptable levels. For this reason, the above-mentioned pressurised sprayers continue to exhibit practical drawbacks when used in the above-mentioned public spaces.

Additionally, American patents U.S. Pat. No. 8,985,482B1 and U.S. Pat. No. 10,532,370B2 disclose a pressurised sprayer which comprises an autonomous compressor module for pressurising the tank of the sprayer. Said patents disclose a sprayer in which the connection between the tank and the compressor module has a specific design. Said pressurised air connection having its own shape makes it difficult to use compressed air lines as well as other known compressor modules. This constitutes a clear disadvantage when replacing the compressor module and when establishing a direct connection to compressed air installations. Additionally, the tank disclosed in the above-mentioned American patents has a complex and highly irregular shape, which results in an uneven distribution of stresses inside the tank, and subjects some surfaces to high internal stresses. Furthermore, the hole of the tank for installing the compressed air inlet valve clearly weakens said region and produces a potential leakage point after repeated pressurisation steps.

SUMMARY OF THE INVENTION

In order to solve the above-mentioned problems of pressurised sprayers known in the prior art, the present invention discloses a pressurised sprayer which comprises a tank, the tank comprising a main body, a head region and a plunger for manually pressurising said tank, a compressed air inlet for automatically pressurising the tank with air from outside, a pressure relief valve, and a compressed flow outlet, the pressurised sprayer also comprising a removable, external compressor module that is independent of the tank, the compressor module for its part comprising an air compressor and a battery for supplying the air compressor with electricity, the compressor module being connected to said compressed air inlet, said compressor module being secured to the sprayer, wherein the compressed air inlet comprises a valve stem, said valve stem for its part being a non-return valve, and wherein the compressor module is connected to said valve stem via a hose having a connection head.

Valve stems are compressed air inlet valves that are widely used and standardised, as a result of which said connection allows for pressurisation of the tank via the compressed air inlet to be carried out using known and commercially available compressor modules. For its part, the connection between the compressor module and the valve stem via a hose allows for rapid replacement when the connections are changed.

Advantageously, the main body of the tank has a substantially cylindrical or prismatic external shape and the head region of the tank substantially has the external shape of a spherical cap.

Preferably, the present invention discloses a sprayer in which the compressed air inlet and the compressed flow outlet are arranged on a connection fitting.

Preferably, the present invention discloses a sprayer in which the main body of the tank has at least one face having a convex external shape without recesses for receiving the compressor module. Said face having a convex external shape is preferably a lateral face.

More preferably, the compressor module of the sprayer comprises at least one element for attachment to the tank. Said attachment element makes it possible to secure the compressor module to the outside of the tank in order to facilitate handling of the sprayer and to ensure the stability thereof. Additionally, the attachment element makes it possible for the connection hose between the compressor module and the tank to not be subjected to stress, thus prolonging the useful life of the device.

Even more preferably, the compressor module is secured to the main body of the tank by means of at least one collar, which acts as an attachment element. Said collar is even more preferably a resilient collar, the circumference of which, at rest, i.e. when no tension is applied, is less than the circumference of the tank. This type of resilient collar is particularly advantageous when it comes to arranging the compressor module on the tank in a fast and secure manner. Alternatively, said collar is a textile or plastics strap having a hook and loop fastener of a known type. Nevertheless, other types of attachment element, such as planar straps having buckles, planar straps having snap buttons or other attachment elements are equally valid.

Advantageously, the compressor module has a face having a concave shape that mates with a face of the main body of the tank having a convex external shape. In this way, the compressor module can be arranged such that it can be adapted to the contour of the tank and thus improve the stability between the two. More advantageously, the main body of the tank comprises at least one peripheral projection for securing the attachment element of the compressor module with respect to a longitudinal axis of the tank. Said at least one peripheral projection makes it difficult for the attachment element to slide along the tank in relation to said longitudinal axis thereof. Even more advantageously, the main body of the tank additionally comprises at least one positioning tab that dimensionally interferes with the compressor module, in order to secure the compressor module against rotation with respect to the longitudinal axis of the tank.

Even more advantageously, the compressor module of the sprayer comprises a recess that mates with said at least one positioning tab of the main body of the tank. In this way, a contact region between the compressor module and the tank of the sprayer is formed in an even more precise manner. Nevertheless, other embodiments in which the positioning tabs are arranged on the tank to the sides of the space reserved for the compressor module are equally valid.

Preferably, the tank having a plunger for manual pressurisation comprises, in the head region, at least one element from the group consisting of the pressure relief valve, the compressed flow outlet and the inlet for compressed air from outside. This simplifies the manufacturing process for the tank and also significantly reduces the concentration of localised stresses that would be present on the tank if there were holes on the lateral surface thereof. More preferably, the pressure relief valve is arranged in the head region of the tank so as to be independent of the compressed air inlet and compressed flow outlet. Said independence reduces the probability of a problem associated with the compressed air inlet and/or the compressed flow outlet affecting the pressure relief valve.

Even more preferably, the pressure relief valve can also be actuated manually, which allows the user of the sprayer to reduce the pressure in the tank in a controlled manner and without having to evacuate flow via the compressed flow outlet. This is advantageous in situations in which the tank continues to house a pressure that is higher than atmospheric pressure after the spraying task has been completed. As such, manual actuation of the pressure relief valve makes it possible to equalise the internal and external pressure of the tank in order to store the pressurised sprayer safely.

Additionally, the pressurised sprayer according to the present invention may advantageously comprise an independent base on which the tank rests in a substantially vertical position. Said base stabilises the pressurised sprayer and allows it to be arranged vertically and independently, without it having to be supported on other surfaces. Moreover, on account of the above-mentioned base, it is possible to use the sprayer when said sprayer is supported on its base, without the user having to carry it and without the tank having to come into contact with external elements of the sprayer, which could weaken said sprayer and cause it to leak.

More advantageously, the sprayer comprises a spray lance that is connected to the compressed flow outlet. Said spray lance allows the user to direct the sprayed flow in a precise manner onto surfaces that would otherwise be difficult to access. Additionally, the spray lance makes it possible to apply sprayed flow onto said surfaces while the user remains at a certain distance therefrom, thus preventing splashes caused by the impact of the compressed flow on the surfaces from striking the user.

Even more advantageously, the sprayer additionally comprises an independent head portion having an internal shape that mates with the upper region of the tank, for receiving the spray lance and at least one identification element. Said identification element may for example be a card that indicates the product contained in the sprayer, such that the sprayer to be used can be identified if there is more than one.

Even more advantageously, the tank of the sprayer according to the present invention additionally comprises a flow suction tube in its interior, which extends along the tank and which is joined internally to the compressed flow outlet. Said suction tube advantageously has a longitudinal axis that is substantially aligned with a longitudinal axis of the tank as well as at least one suction point. Even more advantageously, said suction tube comprises two or more suction points distributed along its longitudinal axis. Providing said suction points makes it possible to exclusively carry out suction of a flow in the liquid state or to carry out suction of a mixed flow, i.e. in the liquid and gaseous state.

Particularly advantageously, the valve stem arranged in the compressed air inlet comprises a metal pivot that opens the valve when pressed, the valve automatically closing when the metal pivot is no longer pressed on account of the pressure inside the chamber, on account of a spring, or both. Additionally and preferably, the valve stem is a Presta, Schrader, Dunlop or Regina valve. Said valves, which are widely used in the field of pressurised tyres, allow the tank to be pressurised by means of generic compressor modules, such as those intended to inflate tyres. This constitutes a significant advantage over the prior art, since it allows the tank to be pressurised using devices that are widely available commercially.

In the present document, the terms "upper" and "lower" are to be understood in relation to a vertical arrangement of the sprayer, i.e. with the base of the sprayer resting on a support surface.

BRIEF DESCRIPTION OF THE DRAWINGS

To aid understanding, explanatory yet non-limiting drawings are included that are representative of an embodiment of a pressurised sprayer according to the present invention.

In the figures, identical or equivalent elements are denoted by the same reference signs.

DETAILED DESCRIPTION OF THE PREFERRED EMBODIMENTS

Figure 1:
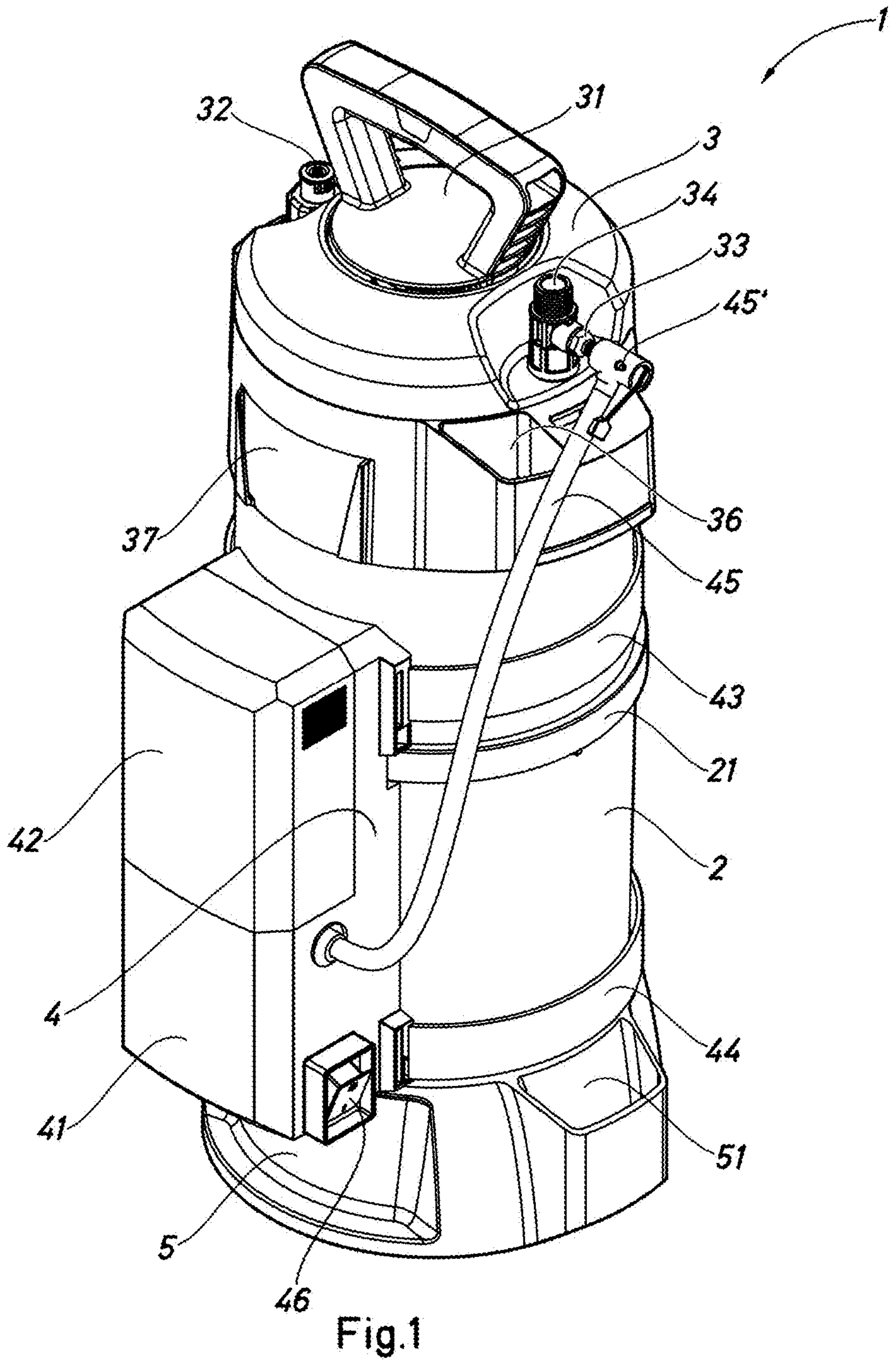
FIG. 1 is a perspective view from above of a pressurised sprayer according to the present invention without the spray lance.
Figure 2:
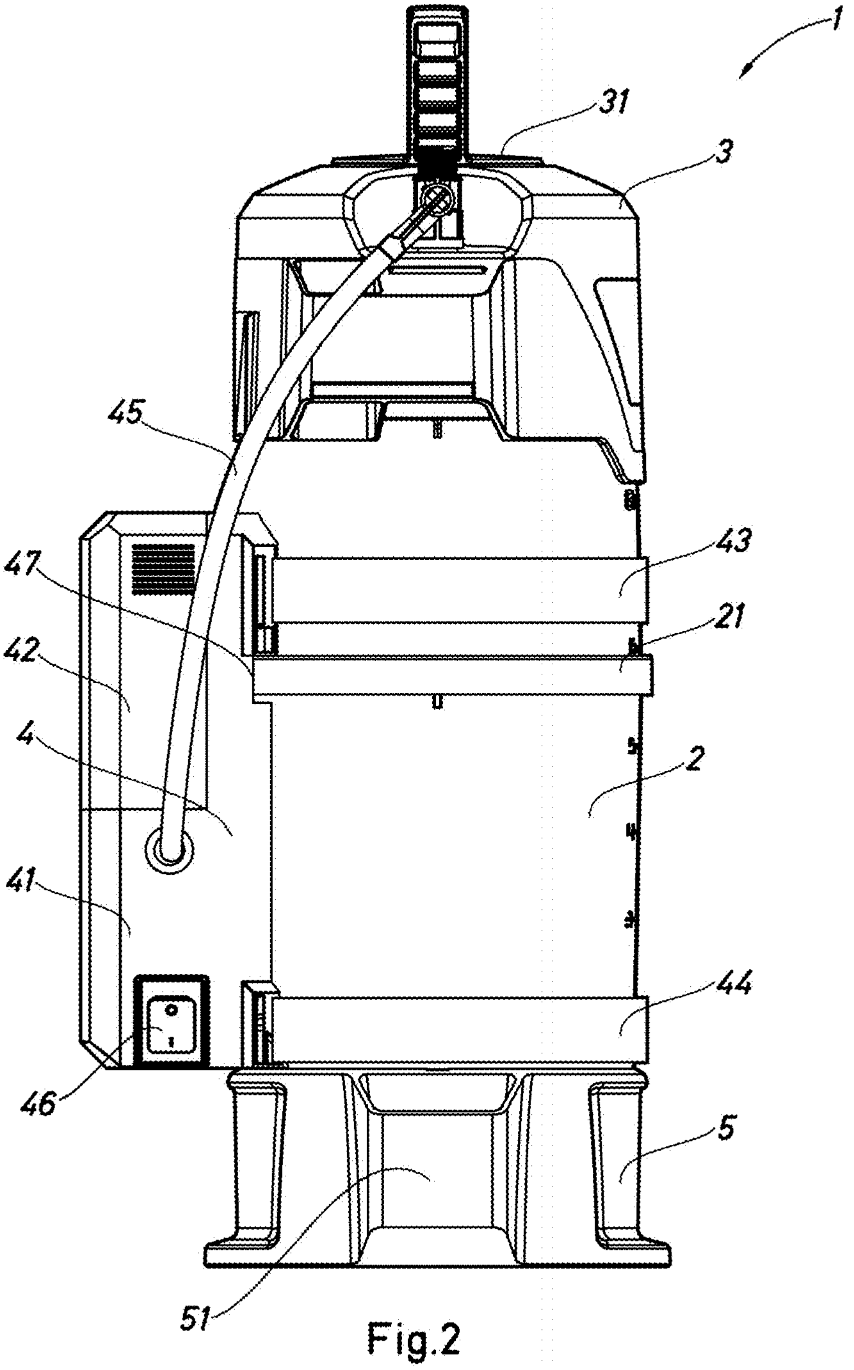
FIG. 2 is a side view of the pressurised sprayer according to the embodiment shown in FIG. 1.

FIGS. 1 and 2 are a perspective view from above and a side view, respectively, of an embodiment of a pressurised sprayer 1 according to the present invention. Said pressurised sprayer 1 comprises a tank 2, an independent decorative head portion 3 that fits in the head region of the tank, a removable, external compressor module 4 that is independent of the tank, and a base 5 for providing the pressurised sprayer 1 with stability in the vertical arrangement thereof and additionally for protecting the tank 2 from impacts that may weaken the structure thereof and reduce the useful life of the pressurised sprayer 1. Furthermore, FIG. 1 shows, in the present embodiment, that the head portion 3 allows for actuation of a plunger 31, said plunger being screwed directly onto the filler neck of the tank, denoted by the reference sign 24 in FIG. 7, for manually pressurising the tank 2 prior to the pressurised sprayer 1 being used. Furthermore, FIG. 1 shows that the pressurised sprayer comprises a pressure relief valve 32, a compressed air inlet valve 33 and a compressed flow outlet 34. Additionally, FIG. 1 shows how the pressure relief valve 32 is arranged independently with respect to the compressed air inlet valve 33 and the compressed flow outlet 34. This reduces the probability that the pressure relief valve 32 will malfunction on account of interference with the incoming air or outgoing flow.

In the present embodiment shown in FIGS. 1 and 2, the pressure relief valve 32 is arranged so as to be diametrically opposed with respect to the compressed air inlet valve 33 and the compressed flow outlet 34. Nevertheless, other arrangements are equally valid. Likewise, the arrangement of the compressed air inlet valve 33 and of the compressed flow outlet 34 in a T-joint could be modified and other arrangements, such as in a Y shape, could be adopted. Alternatively, the arrangement of the compressed air inlet valve 33 and of the compressed flow outlet 34 could be modified such that they are independent of one another.

Additionally, FIGS. 1 and 2 also show the compressor module 4 arranged on the outer surface of the tank 2, and more specifically on the main body of the tank. The tank 2 additionally comprises a peripheral projection 21 that provides the tank with strength and that also constitutes a support region for the compressor module 4. This can be seen more clearly in FIGS. 2, 4, 5, 8 and 9. FIG. 1 shows that a concave face of the compressor module 4 has a shape that matches the outer surface of the tank 2 in order to facilitate positioning of said compressor module and the stability of the device. Said matching shape can be seen more clearly in FIGS. 4, 5, 8 and 9, in which components of the sprayer are shown in isolation. The compressor module 4, which comprises a compressor 41 and a battery 42 for supplying electricity to the compressor 41, is in contact with the tank 2 on account of attachment means, which, in the present embodiment, are two textile straps 43, 44 of a known hook and loop fastener type. Furthermore, the connection between the compressor module 4 and the compressed air inlet valve 33 is established via a connection head 45' and a flexible hose 45, which allows for rapid and convenient connection and disconnection. The compressor module 4 is turned on and off by means of a switch 46. In the embodiment shown, the switch 46 is a rocker switch, but other types of switch known from the prior art are equally valid.

FIG. 1 also shows how the independent decorative head portion 3 defines a through-hole 36 for allowing a spray lance to pass through. Furthermore, the head portion 3 comprises a card holder 37 for receiving identification cards, which may indicate, for example, the type of liquid inside the pressurised sprayer 1. Furthermore, the base 5 of the pressurised sprayer 1 comprises a receptacle 51 that is suitable for receiving an end of the spray lance when said spray lance is not being used. Said through-hole 36 and receptacle 51 allow for a compact arrangement of the sprayer 1, which facilities storage thereof. Said compact arrangement of the sprayer 1 can be seen more clearly in FIG. 10, in which the spray lance is shown with the reference sign 35.

FIG. 2, in addition to some features already mentioned in relation to FIG. 1, shows that the compressor module 4 comprises a recess 47 that mates with the peripheral projection 21, which allows for at least some of the weight of the compressor module 4 to rest directly on the tank 2.

Figure 3:
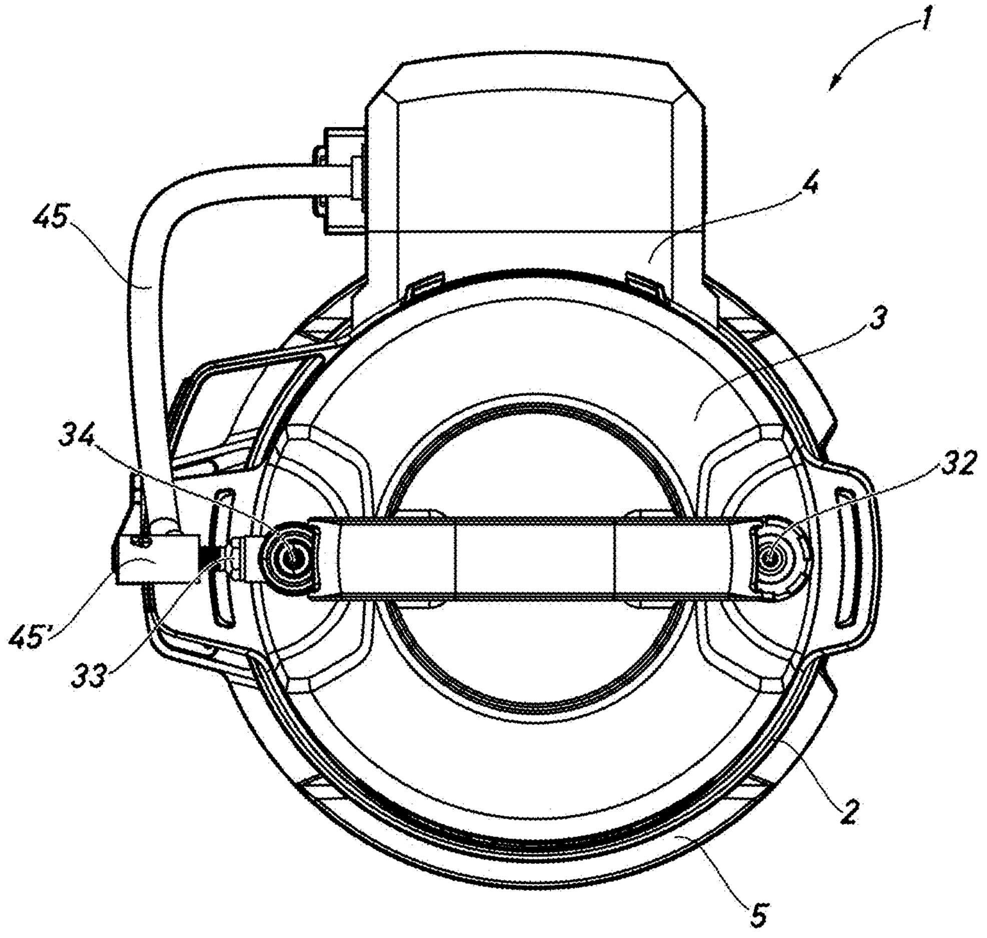
FIG. 3 is a plan view of the pressurised sprayer according to the embodiment shown in FIG. 1.
Figure 7:
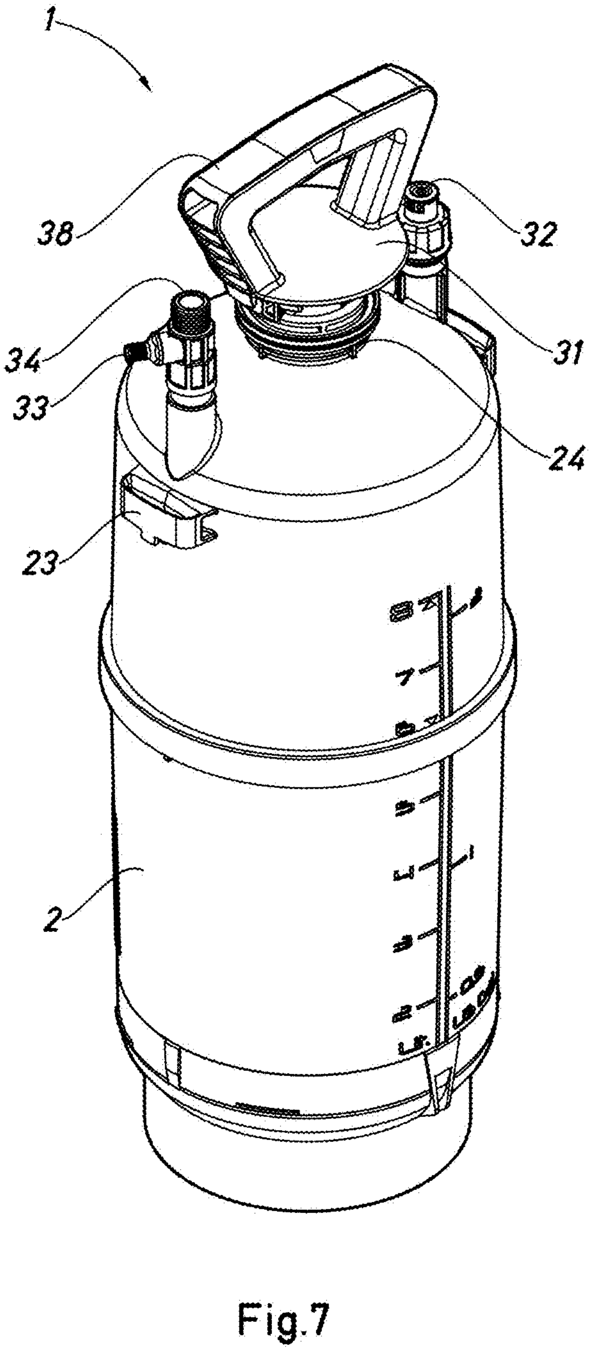
FIG. 7 is a perspective view from above of the pressurised sprayer according to the embodiment shown in FIG. 1 but without the compressor module, head portion and base.

FIG. 3 is a view from above of the pressurised sprayer shown in FIGS. 1 and 2. FIG. 3 shows the substantially cylindrical shape of the head portion 3, tank 2 and base 5, which are partially hidden below said head portion 3. Additionally, it clearly shows how a concave face of the compressor module 4, denoted by the reference sign 48 in FIG. 7, is adapted to the outer convex shape of the tank 2. FIG. 3 also shows the arrangement of the pressure relief valve 32 diametrically opposed to the compressed air inlet 33 and compressed flow outlet 34 valves, as well as the connection between the connection head 45' and said compressed air inlet valve 33.

Figure 4:
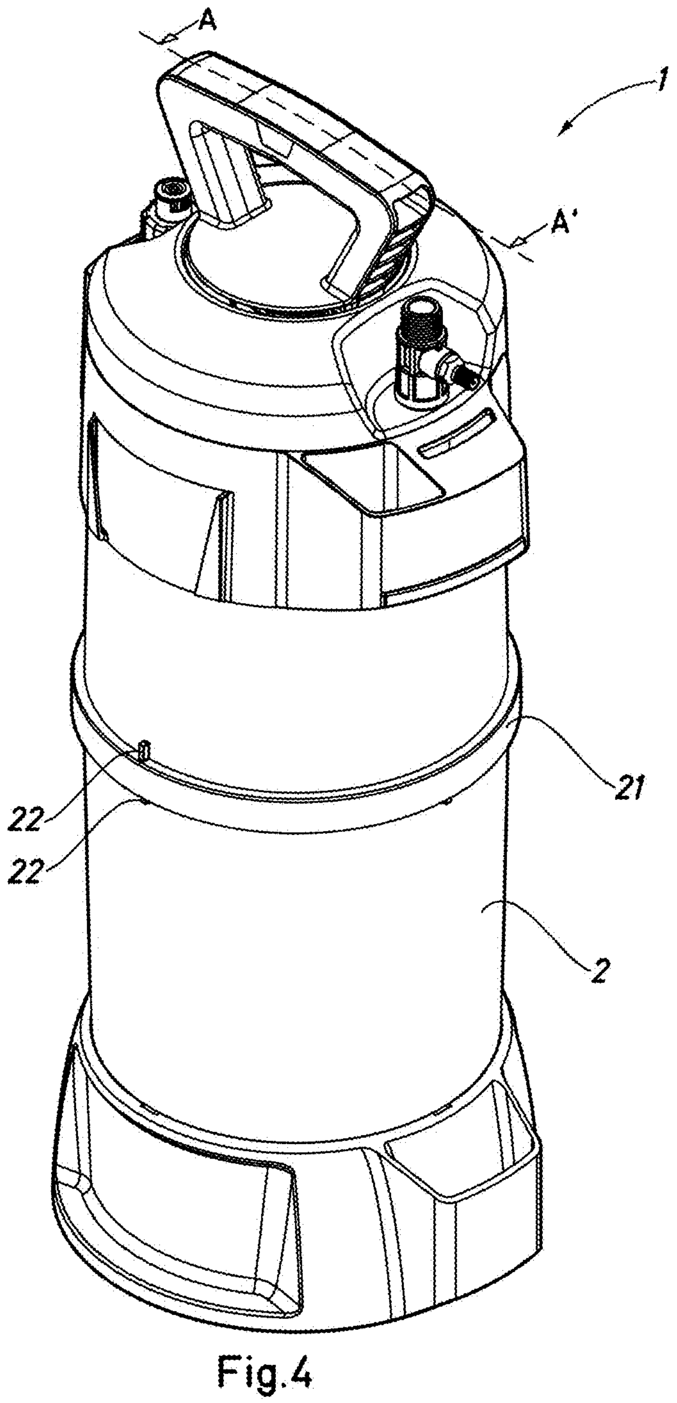
FIG. 4 is a perspective view from above of the pressurised sprayer according to the embodiment shown in FIG. 1 without the compressor module.

FIG. 4 is a perspective view from above of the pressurised sprayer 1 shown in the preceding figures without the compressor module. This figure more clearly shows the outer shape of the tank 2, which is substantially cylindrical in the present embodiment. Nevertheless, tanks having other shapes are equally valid. Likewise, FIG. 4 shows the arrangement and shape of the peripheral projection 21 and of the positioning tab 22 arranged on said projection 21.

Figure 5:
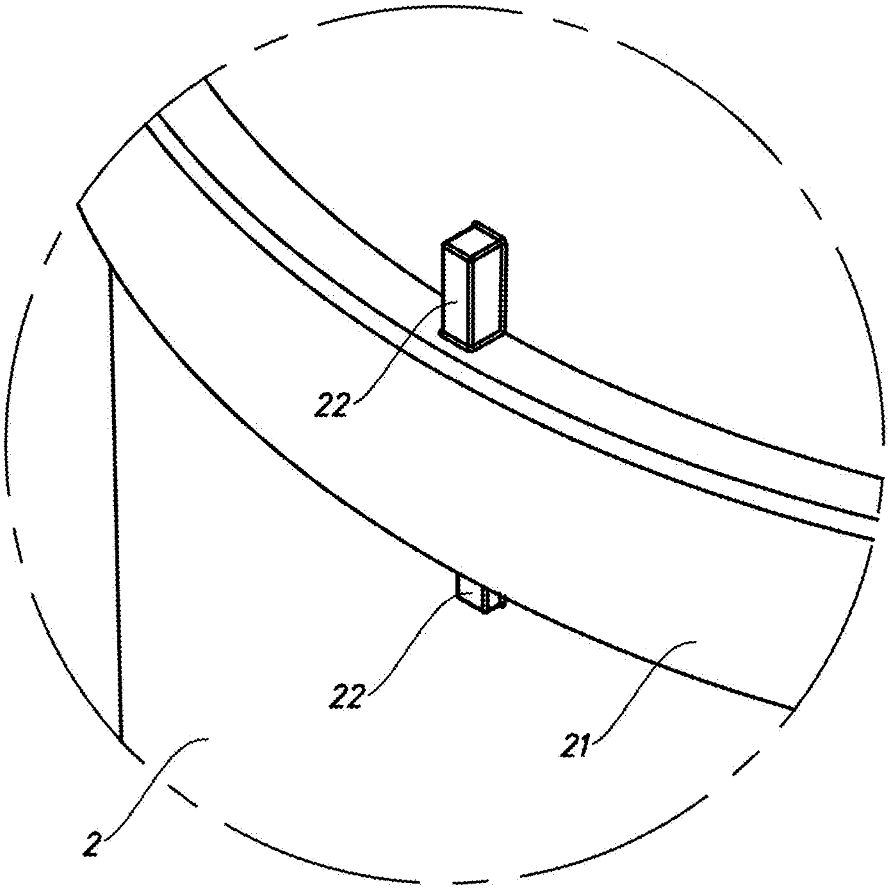
FIG. 5 is a detailed view of a positioning tab arranged on the tank of the pressurised sprayer shown in FIG. 4.

FIG. 5 is a detailed view of the positioning tab 22 of the compressor module arranged on the tank 2. In this embodiment, the positioning tab 22 is a substantially prism-shaped tab that is arranged on the wall of the tank 2 and on the peripheral projection 21, extending on both sides (upper and lower) of said peripheral projection 21. Nevertheless, the tab may alternatively have a different shape and its arrangement may also be different, said positioning tab 22 being arranged solely on the wall of the tank 2 or on the peripheral projection 21.

Figure 6:
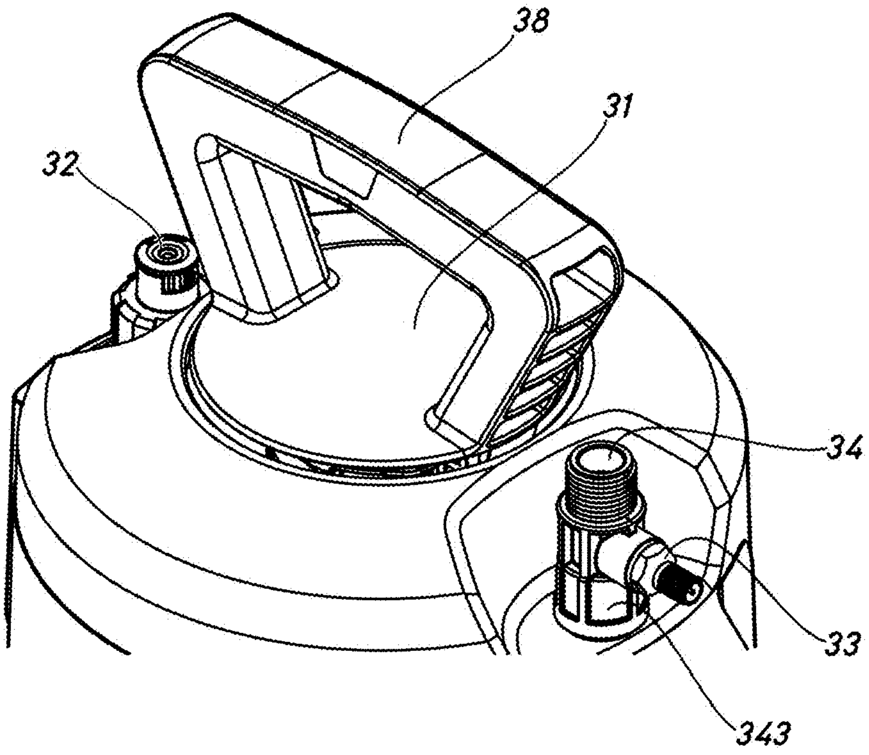
FIG. 6 is a detailed view of the upper part of the tank and the independent decorative head portion according to the embodiment shown in any one of the preceding figures.

FIG. 6 is a detailed view of the head portion 3 of the pressurised sprayer shown in the preceding figures. FIG. 6 shows the outer shape of the plunger 31, with a handle 38 that makes it easier for a user to pressurise the tank by means of a reciprocating linear motion. Furthermore, FIG. 6 shows that the compressed air inlet valve 33 is a Schrader-type valve. Nevertheless, other valve stems are equally valid, for example Dunlop, Regina or Presta-type valves, among others. The compressed air inlet valve 33 and the compressed flow outlet 34 are arranged in the head region of the tank 2. More specifically, the tank 2 is designed such that said inlet 33 and outlet 34 are arranged so as to maintain intactness and strength from a pressure resistance point of view. It should be noted that the head region of the tank, being substantially spherical, is better suited for receiving said compressed air inlet 33 and compressed flow outlet 34 than the lateral region of the tank, which is substantially cylindrical. As such, in the embodiment shown, the localised stresses due to the internal working pressure are much less pronounced than if the valves were installed on said main body of the tank, thus increasing the useful life of the device. Furthermore, FIG. 6 shows how the compressed air inlet valve 33 and the compressed flow outlet 34 are arranged on a T-shaped connection fitting 343. Said T-shaped connection fitting 343 may have an internal shape that allows for direct fluid communication between the compressed air inlet valve 33 and the compressed flow outlet 34 or, alternatively, it may have an internal separation between the two.

FIG. 7 is a perspective view from above of the pressurised sprayer 1 shown in the preceding figures without the compressor module, head portion and base. This figure more clearly shows the mouth 24 arranged in the upper region of the tank 2 on which the plunger 31 is coupled. In the present embodiment, the mouth 24 is threaded for connection to the plunger 31 by means of a mating thread. Nevertheless, other means of connection known in the art such as connectors with or without a sealing gasket may be used. Additionally, FIG. 7 shows connections 23 for the arrangement of a carrying strap (not shown in the present figure) of the pressurised sprayer 1.

Figure 8:
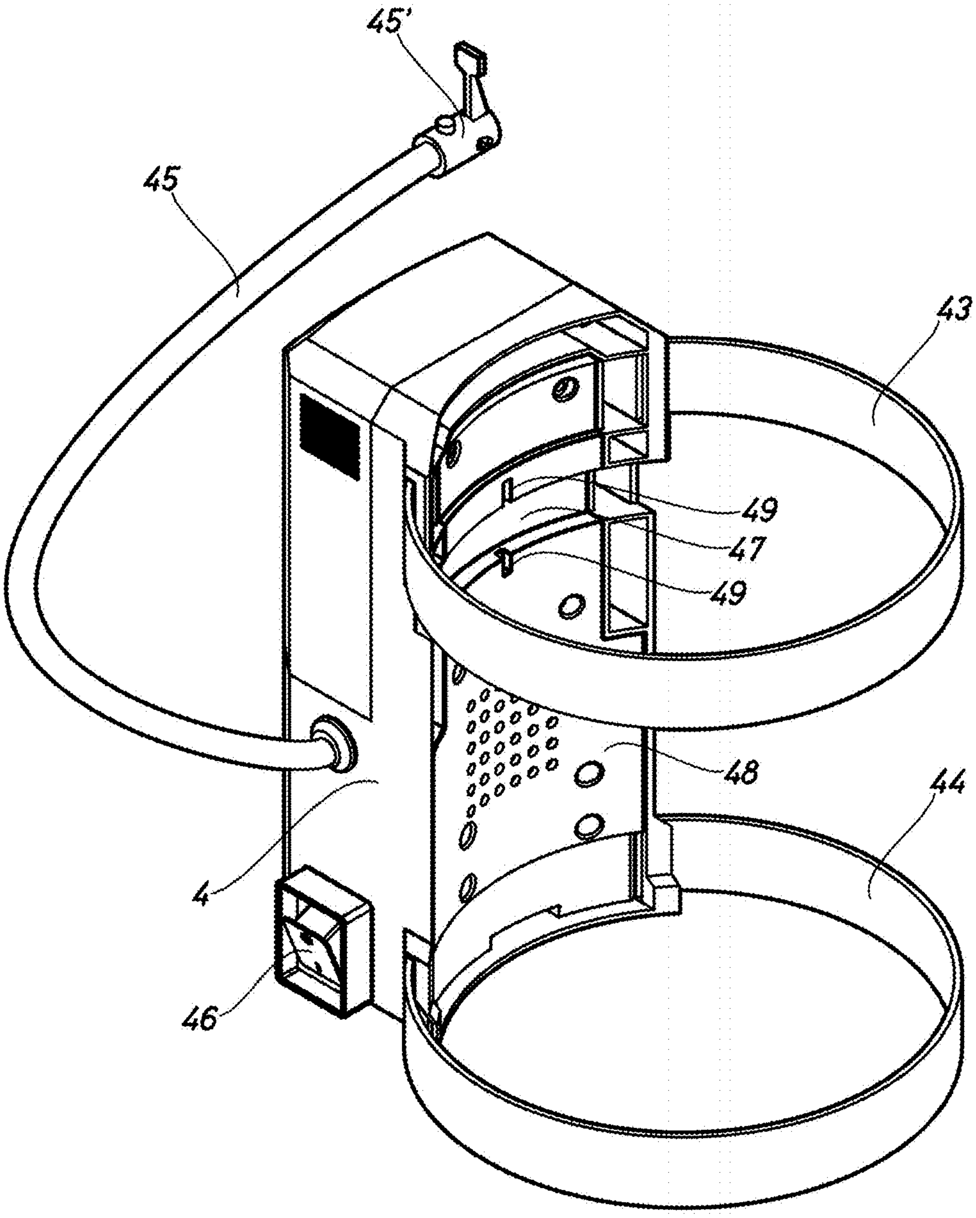
FIG. 8 is a perspective view from above of the compressor module according to the embodiment shown in FIG. 1.

FIG. 8 is a perspective view from above of the removable, external compressor module 4, which is independent of the tank, according to the embodiment shown in the previous figures. FIG. 8 shows the compressor module 4, in which a concave face 48 thereof can be seen to have a shape that matches the outside of the tank 2. More specifically, the face 48 can be seen to have a general concave shape to fit the general convex shape of the side of the tank and, additionally, the compressor 4 can be seen to comprise a recess 47 for coupling to the peripheral projection 21 of the tank. Moreover, the compressor module 4 comprises, on the concave face 48 thereof, a positioning slot 49 that has a shape that matches the positioning tab 22. Additionally, FIG. 8 shows the collars 43, 44 as well as the rocker switch 46 for turning the compressor module 4 on and off. The compressed air flows from the compressor module 4 to the tank 2 (not shown) through a flexible hose 45 on the end of which is a connection head 45'.

Figure 9:
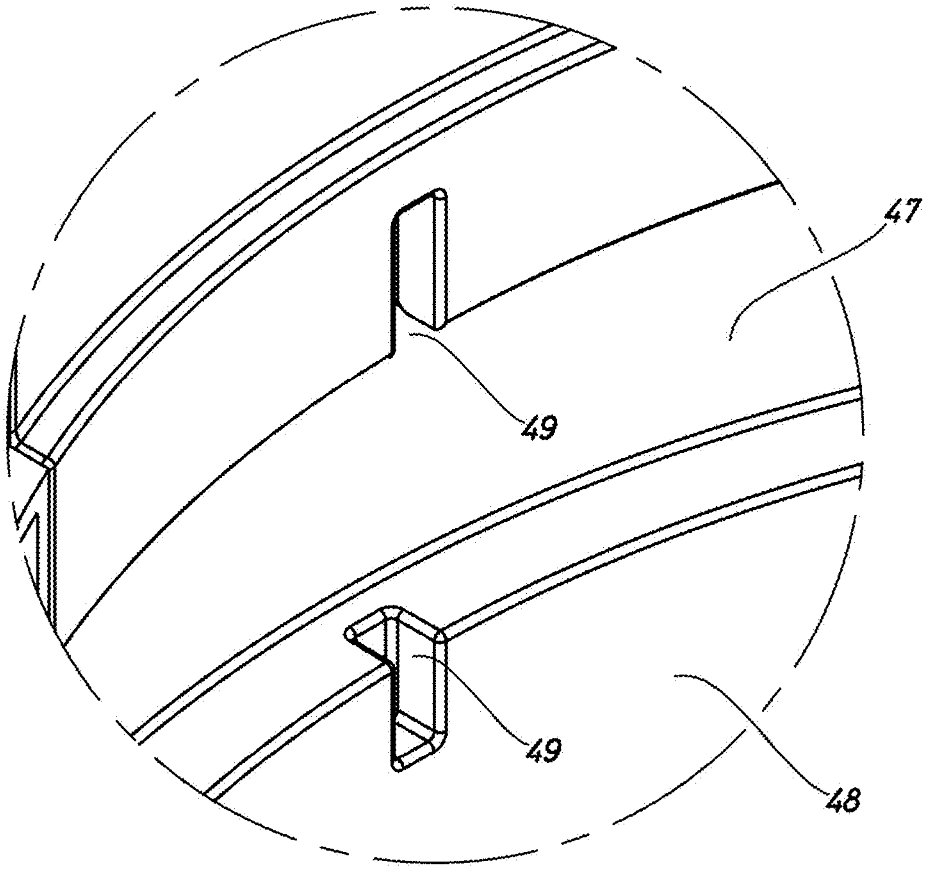
FIG. 9 is a detailed view of a positioning slot on the compressor module of the pressurised sprayer shown in FIG. 8.

FIG. 9 is a detailed view of the positioning tab 49 and recess 47 on the concave face 48 of the compressor module 4. As explained previously in relation to the positioning tab 22, the shape and arrangement of the positioning slot 49 may be altered so as to act as a positioning point for the tab 22.

Figure 10:
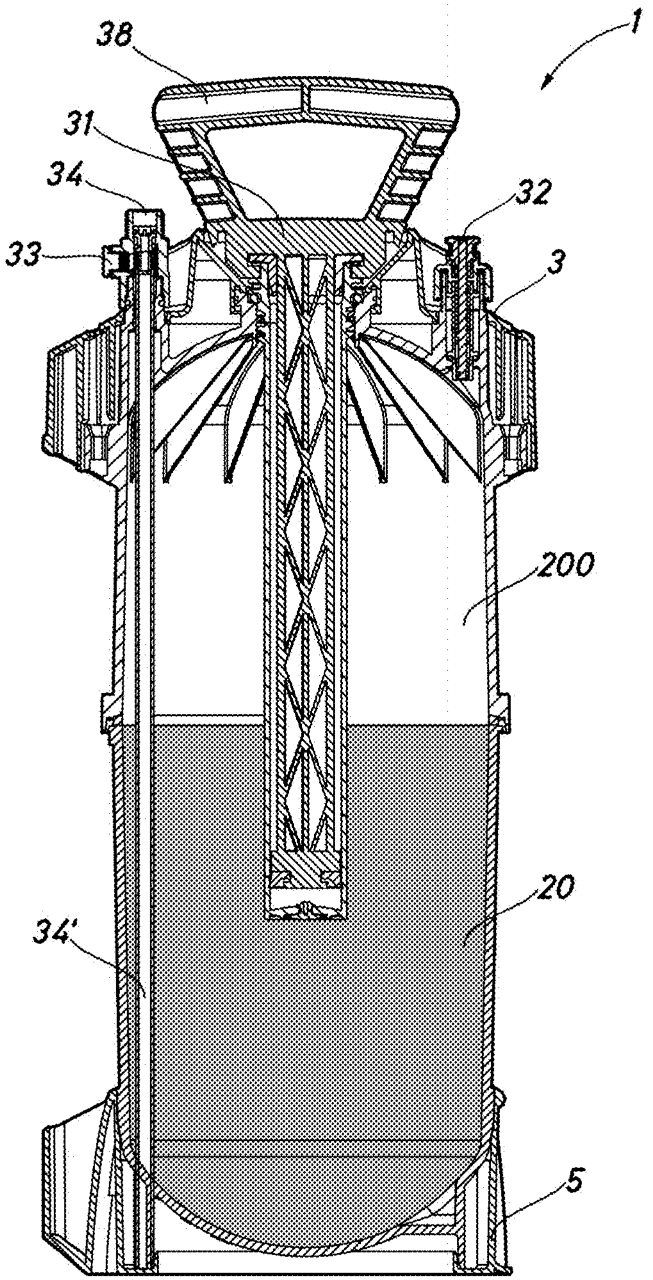
FIG. 10 is a sectional view along the plane A-A' shown in FIG. 4.

FIG. 10 is a sectional view along the plane A-A' shown in FIG. 4. FIG. 10 shows the connection between the head portion 3 and the tank 2, as well as the arrangement of the tank 2 on the base 5. Additionally, FIG. 10 shows the communication between the inside and the outside of the tank 2 via the pressure relief valve 32, the compressed air inlet valve 33 and the compressed flow outlet 34 arranged in the head region of the tank 2. Furthermore, FIG. 10 shows part of the plunger 31 arranged inside the tank, as well as part of an internal suction tube 34' that connects the compressed flow outlet 34 to the inside of the tank 2. More specifically, said suction tube 34' extends to the lower part of the tank, making it possible to suck up the liquid 20 contained in the lower part of the tank 2. Equally, the suction tube 34' may comprise more than one suction point for additionally sucking up compressed air 200.

Figure 11:
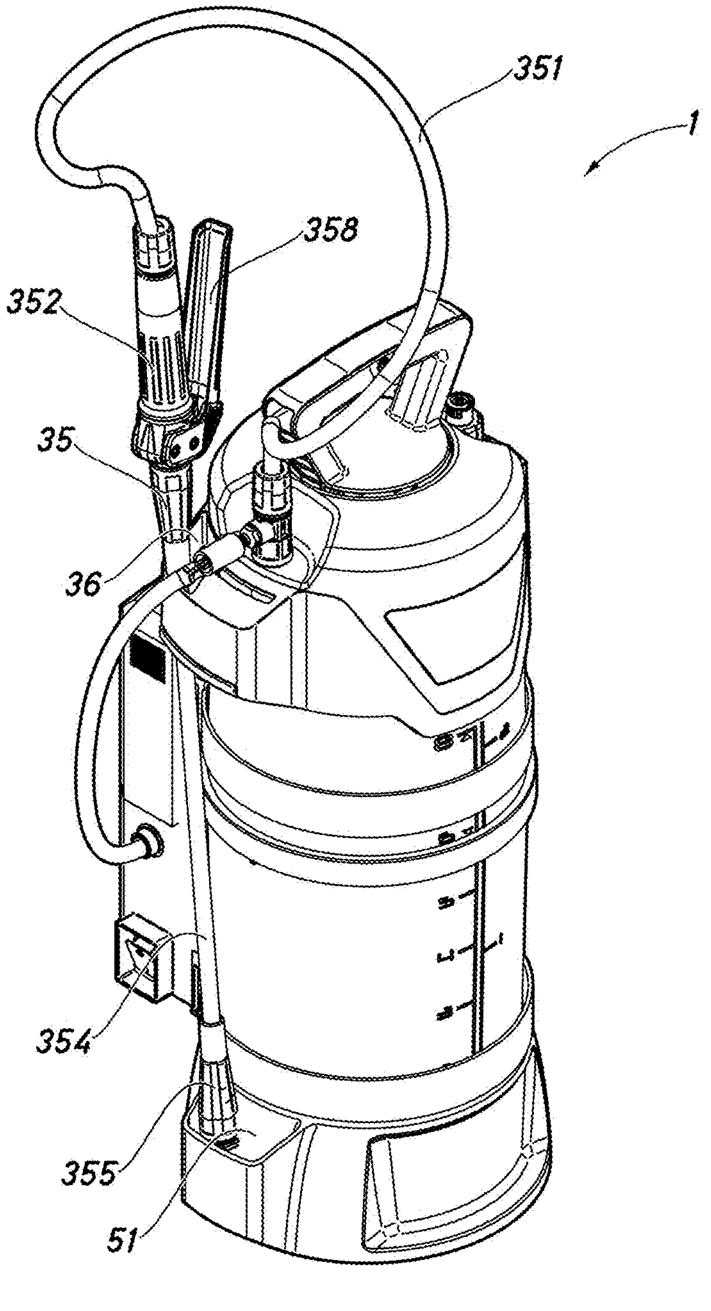
FIG. 11 is a perspective view of the pressurised sprayer according to the embodiment shown in FIG. 1 with the spray lance.

FIG. 11 is a front view of the pressurised sprayer 1 illustrated in the previous figures and with a spray lance 35. Said spray lance 35 is connected to the pressurised flow outlet 34 and allows the user to apply the pressurised flow onto a surface on which they wish to work. The spray lance 35 in the present embodiment comprises a connection hose 351 and a substantially rigid end 354 that comprises a grip handle 352, an actuation trigger 358 and an outlet nozzle 355. As described earlier, the spray lance 35 allows the user to apply the pressurised flow onto surfaces at a certain distance from the tank 2 of the pressurised sprayer 1, thus increasing the range of the device. FIG. 11 additionally shows how the spray lance 35 can be arranged in a compact manner by inserting it through the through-hole 36 and into the receptacle 51.

Although the invention has been described and represented based on a representative example, it should be understood that said exemplary embodiment in no way limits the present invention, and as such any of the variations that are included directly or by way of equivalence in the content of the appended claims should be considered included within the scope of the present invention.

What is claimed is:

1. A pressurized sprayer, comprising:
- a tank comprising a main body, a head region, and a plunger for manually pressurizing said tank;
- a compressed air inlet for automatically pressurizing the tank with air from outside;
- a pressure relief valve;
- a compressed flow outlet; and
- a removable, external compressor module that is independent of the tank, the compressor module comprising an air compressor and a battery for supplying the air compressor with electricity, the compressor module being connected to said compressed air inlet, said compressor module being secured to the main body of the tank, wherein the compressed air inlet comprises a valve stem, said valve stem for its part being a non-return valve, and wherein the compressor module is connected to said valve stem via a hose having a connection head.

2. The pressurized sprayer according to claim 1, wherein the main body of the tank has a substantially cylindrical or prismatic external shape and the head region of the tank substantially has the external shape of a spherical cap.

3. The pressurized sprayer according to claim 1, wherein the compressed air inlet and the compressed flow outlet are arranged on a connection fitting.

4. The pressurized sprayer according to claim 1, wherein the main body of the tank has at least one face having a convex external shape without recesses for receiving the compressor module.

5. The pressurized sprayer according to claim 4, wherein the compressor module has a face having a concave shape that mates with said at least one face of the main body of the tank.

6. The pressurized sprayer according to claim 1, wherein the compressor module is secured to the main body of the tank by at least one collar.

7. The pressurized sprayer according to claim 6, wherein said at least one collar is a textile or plastics strap having a hook and loop fastener.

8. The pressurized sprayer according to claim 6, wherein the main body of the tank comprises at least one peripheral projection for securing said at least one collar of the compressor module with respect to a longitudinal axis of the tank.

9. The pressurized sprayer according to claim 8, wherein the main body of the tank further comprises at least one external positioning tab that dimensionally interferes with the compressor module, in order to secure the compressor module against rotation with respect to the longitudinal axis of the tank.

10. The pressurized sprayer according to claim 9, wherein the compressor module comprises a recess that mates with said at least one external positioning tab of the main body of the tank.

11. The pressurized sprayer according to claim 1, wherein the tank having a plunger for manual pressurization comprises, in the head region, the pressure relief valve, the compressed flow outlet and the inlet for compressed air from outside.

12. The pressurized sprayer according to claim 11, wherein the pressure relief valve is arranged in the head region of the tank so as to be independent of the compressed air inlet and compressed flow outlet.

13. The pressurized sprayer according to claim 1, further comprising an independent base on which the tank rests in a substantially vertical position.

14. The pressurized sprayer according to claim 1, further comprising a spray lance that is connected to the compressed flow outlet.

15. The pressurized sprayer according to claim 14, further comprising an independent head portion having an internal shape that mates with the head region of the tank, for receiving the spray lance and at least one identification element.

16. The pressurized sprayer according to claim 1, wherein the tank further comprises a flow suction tube in its interior, which extends along the tank and which is joined internally to the compressed flow outlet.

17. The pressurized sprayer according to claim 1, wherein the valve stem comprises a metal pivot that opens the valve when pressed, the valve automatically closing when the metal pivot is no longer pressed on account of the pressure inside the chamber, on account of a spring, or both.

* * * * *